United States Patent [19]

Agustin

[11] 4,410,195

[45] Oct. 18, 1983

[54] BICYCLE WITH IMPROVED SAFETY

[76] Inventor: Hermenegildo C. Agustin, 47-710 Hui Alala St., Kaneohe, Hi. 96744

[21] Appl. No.: 334,562

[22] Filed: Dec. 28, 1981

[51] Int. Cl.³ .............................................. B62L 1/00
[52] U.S. Cl. ................................ 280/264; 188/24.11; 188/30; 280/289 R; 280/296
[58] Field of Search .............. 280/270, 296, 293, 218, 280/289 R, 264, 200, 1.181, 1.182; 188/24.11, 24.18, 30

[56] References Cited

U.S. PATENT DOCUMENTS 2,038,987  4/1936  Browne ................................. 188/30
3,492,012  1/1970  Salih .................................... 280/218
4,074,910  2/1978  Hoffman et al. ................. 280/289 R Primary Examiner—Joseph F. Peters, Jr.
Assistant Examiner—Donn McGiehan
Attorney, Agent, or Firm—Bruce L. Birchard

[57] ABSTRACT

By providing a bicycle with a one-way brake coupled between the front wheel and the frame of the bicycle, the one-way brake being configured to permit only forward rotation of the front wheel, dangerous reverse rotation of the front wheel, which accompanies turning abruptly without adequate forward momentum and/or with an incorrect leaning angle, is avoided and the precipitous falling and serious injury to the rider which normally accompanies reverse rotation of the front wheel under these conditions is prevented.

2 Claims, 3 Drawing Figures

BICYCLE WITH IMPROVED SAFETY

BACKGROUND OF THE INVENTION

1. Field of the Invention

This invention relates to the field of bicycles and, more particularly, to bicycles having improved safety for the rider.

2. Prior Art

A search of the prior art revealed the following patents which are related to but do not anticipate the present invention.

U.S. Pat. No. 508,832 (Odell)
U.S. Pat. No. 2,149,761 (Coats)
U.S. Pat. No. 2,259,987 (Bailee)
U.S. Pat. No. 2,038,987 (Browne)

The Odell patent fails to show or suggest the use of a one-way clutch interposed between the front wheel and frame of a bicycle to prevent the rider from falling and becoming injured. Odell interposes a roller or rolling contact between the brake shoe and the tire of a bicycle to avoid wearing of the tire. Thus, Odell does not disclose or suggest the invention claimed here.

The Coats U.S. Pat. No. 2,149,761 fails to show or suggest the interposition of a one-way clutch between the front wheel and the frame of a bicycle to prevent the bicycle from rotating backward with consequent injury to the rider. Coats shows a bicycle lock which prevents rotation of the front wheel of the bicycle around either its horizontal axis or around its vertical axis.

The Bailee U.S. Pat. No. 2,259,987 discloses a brake member 25 which is adapted to engage the tire on a wheel of a child's vehicle at an acute angle to prevent rearward rotation of the wheel and rearward motion of the vehicle carried by the wheel. There is no showing or suggestion of a bicycle with a one-way brake interposed between the front wheel and the frame of the bicycle to prevent reverse rotation of the front wheel of the bicycle and falling of and injury to the rider of the bicycle.

U.S. Pat. No. 2,038,987 (Browne) is directed to a rollback stop for "self-propelled vehicles" (Col. 1, lines 1-5). The invention is further described as "not requiring the judgment of the driver to voluntarily apply the brakes." (Col. 1, lines 5-8). The Browne patent does not show or suggest the interposition of a one-way brake between the front wheel and the frame of a bicycle to automatically prevent the backward rotation of the front wheel of the bicycle with the usually attending precipitous falling of and injury to the rider.

Not only on upward inclines but also on horizontal surfaces the turning of a bicycle requires the proper combination of forward momentum and angle of lean of the combination of the bicycle and rider. If this combination is not realized and the turn is excessively abrupt the bicycle stalls and the front wheel reverses its rotational direction resulting in the rider's falling precipitously. It is as though his entire supporting platform (the bicycle) has slid rapidly out from under him. If the reverse rotation of the front wheel can be prevented, the rider will have adequate time to extend his leg and foot and to break his fall, thus minimizing his injury.

Therefore, it is an object of the present invention to overcome the general problems of the prior art bicycles.

It is a further object of this invention to provide an improved bicycle which provides improved safety for its rider.

It is a still further object of this invention to provide an improved bicycle in which the front wheel will not rotate backward despite a stalling of the forward speed.

SUMMARY OF THE INVENTION

Stated succinctly, by coupling a one-way brake, appropriately unidirectional, between the front wheel and the front fork of a bicycle, backward rotation of the front wheel of the bicycle is automatically prevented and precipitous falling of (and injury to) the rider is prevented.

BRIEF DESCRIPTION OF THE DRAWINGS

The present invention can best be understood by referring to the description which follows taken in conjunction with the accompanying drawings, in which.

DETAILED DESCRIPTION OF A PREFERRED EMBODIMENT

Figure 1:
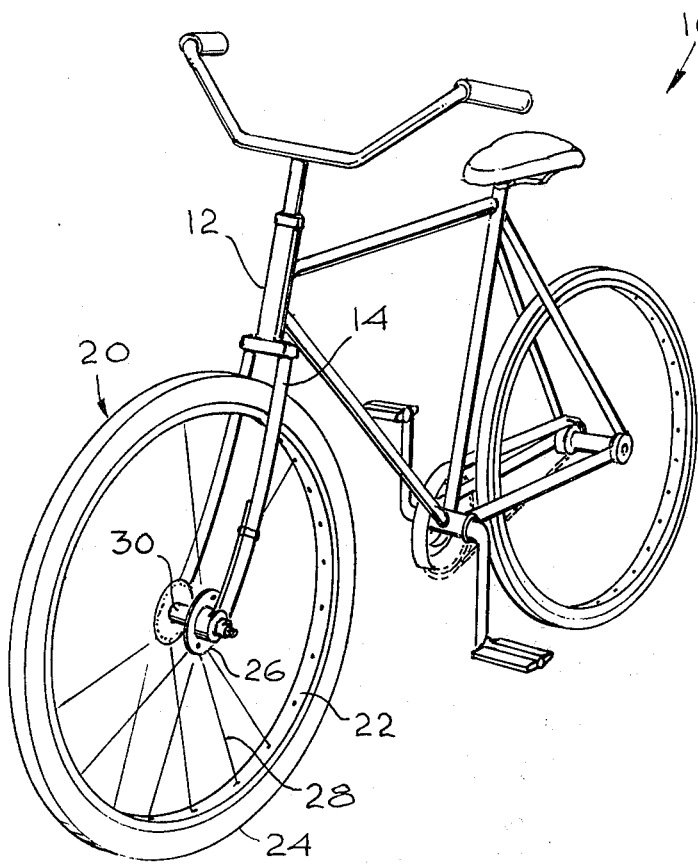
FIG. 1 is an isometric view of a bicycle incorporating my invention.
Figure 2:
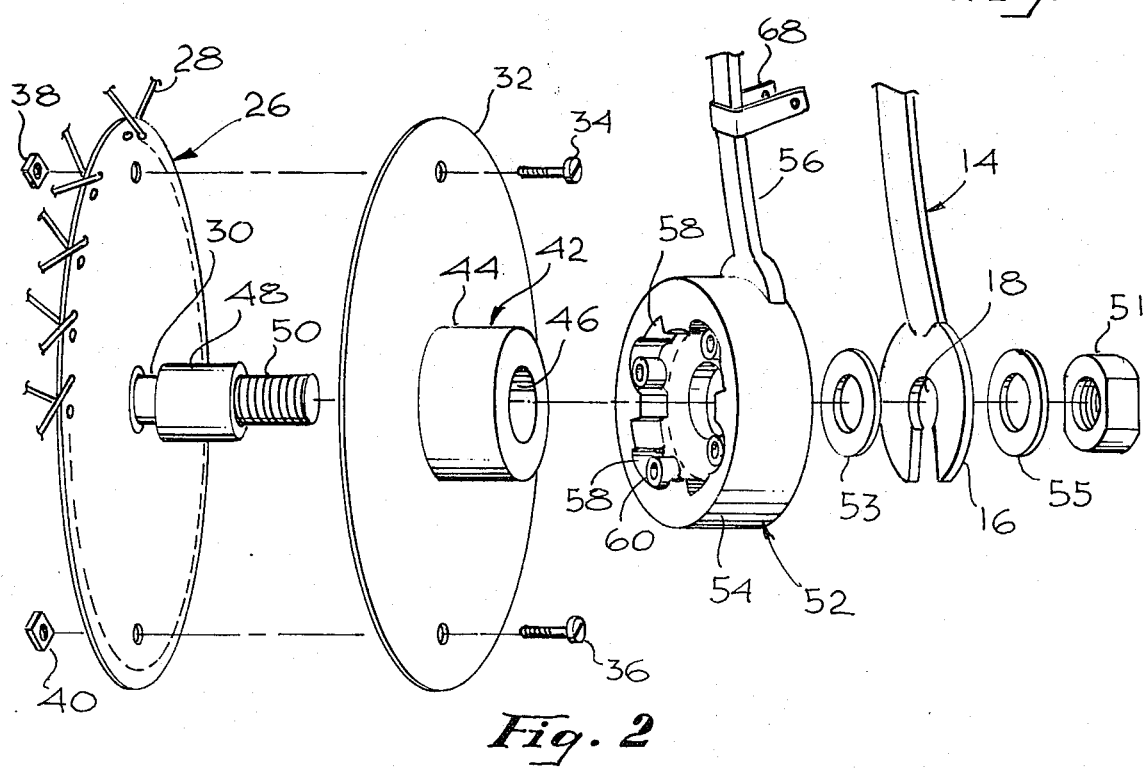
FIG. 2 is an exploded view of a portion of the bicycle of FIG. 1.

In FIG. 1, bicycle 10 has a frame 12, including a front fork 14. As can be seen more clearly in FIG. 2, fork 14 is split at its lower end, 16, and has an axle-receiving opening 18.

Front wheel 20 of bicycle 10 has a rim 22 carrying a tire 24, thereon. Wheel 20 also has a centrally located, coaxial disk 26, which serves as a central terminus for spokes 28, and an axle 30 which supports wheel 20 in fork 14 through ball or roller bearings, not shown. Brake cover 32 is secured by means of bolts 34, 36 and associated, respective nuts 38, 40 to coaxial disk 26.

Brake cover 32 carries hollow cylinder 42 coaxially thereon. Cylinder 42 has an outer bearing surface 44 and an inner bearing surface 46.

Axle 30 has bearing portion 48 integral therewith, followed by threaded portion 50, which cooperates with nut 51 and washers 53, 55 in assembling the elements of the invention.

Brake body 52 has a housing portion 54 and a bracket portion 56. The details of housing portion 54 can best be seen in FIG. 3.

Figure 3:
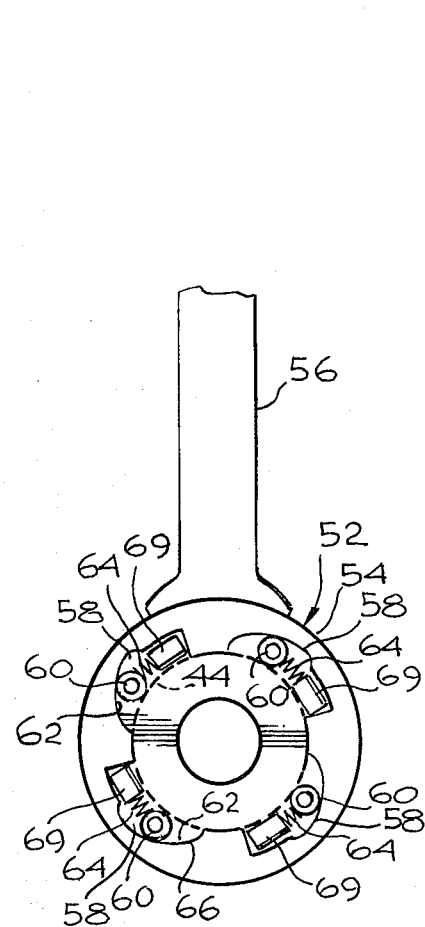
FIG. 3 is an elevational view of a component in the exploded view of FIG. 2.

Housing portion 54 includes a plurality of recesses 58 each of which contains a roller-bearing 60 riding on a cam surface 62 and urged along cam surface 62 towards contact with bearing surface 44 by a spring 64. Rotation of bearing surface 44 in a clockwise relationship to brake body portion 52 (as seen in FIG. 3) is free, with roller bearing 60 in free-rotating contact between bearing surface 44 and cam surface 62. This direction of rotation of bearing surface 44 corresponds to forward motion of bicycle 10 with a related direction of rotation of wheel 20.

Rotation of wheel 20 in the opposite direction, with bearing surface 44 executing counterclockwise rotation with respect to body 52, results in roller bearing 60 coming into binding engagement between portion 66 of cam surface 62 and bearing surface 44, braking the counterclockwise rotation of bearing surface 44 and preventing reverse rotation of wheel 20. Spring 64 may be supported on an insert 69.

Clamp 68 secures bracket portion 56 to fork 14 to assure that backward rotation of wheel 20 cannot occur.

While a particular embodiment of the present invention has been shown and described, it will be apparent to those skilled in the art that modifications and variations may be made without departming from the spirit and scope of the invention. It is the purpose of the appended claims to cover all such variations and modifications.

I claim:

1. A bicycle with improved safety including a frame, said frame including a front fork portion having a pair of arms, each of said arms having an axle-supporting opening at its lower end, each said axle-supporting openings being coaxial with and opposed to the other axle-supporting opening;

an axle having threaded end-portions, a central support portion and a sleeve adjacent one of said threaded end portions, said sleeve being fixed with respect to said axle and having a first outer-bearing surface of a first diameter;

a front wheel rotatably supported on said axle and having a centrally located coaxial disk rotatable with said front wheel;

a brake cover having a disk portion and a hollow-cylinder portion supported coaxially thereon, said hollow-cylinder portion having an inner bearing surface and a second outer bearing surface, both coaxial with said disk portion;

said brake cover being secured to said centrally located coaxial disk for rotation therewith;

a brake body including a housing portion and a bracket portion, said housing portion having an opening therethrough for passage of said axle and having a central recess therein for receiving said hollow-cylinder portion;

said central recess having a plurality of control recesses disposed about said central recess, each of said control recesses having a cam surface and a barrier;

a roller bearing positioned in each of said control recesses for movement over said cam surface;

a spring urging each of said roller bearings along its respective cam surface away from said barrier and into contact with said second outer bearing surface of said hollow-cylinder portion;

said inner bearing surface of said hollow-cylinder portion being in rotational engagement with said first outer bearing surface of said sleeve on said axle;

said bracket portion being secured to an adjacent one of said arms of said front fork;

and means for securing said axle to said arms of said front fork.

2. A bicycle with improved safety including:

a frame, said frame including a front fork portion having a pair of arms, each of said arms having an axle-supporting opening at its lower end;

an axle fixedly supported in said axle-supporting openings;

a front wheel rotatably supported on said axle and having a centrally-located coaxial disk rotatable with said front wheel;

a one-way brake coupled between said centrally-located coaxial disk and an adjacent one of said pair of arms in said front fork and being oriented for preventing backward rotation of said wheel;

a hollow cylinder carried coaxially on said coaxial disk and having an inner bearing surface and an outer bearing surface;

said one-way brake including a body portion having a coaxial opening therethrough and having a recess in one face thereof, said recess including a plurality of symmetrically and coaxially disposed cam surfaces;

a plurality of roller bearings, one supported on each of said cam surfaces and an equal plurality of springs, each urging a respective one of said roller bearings into binding engagement between said outer bearing surface and said cam surface, said cam surface being shaped to effect such binding engagement in one direction of rotation of said wheel, only:

said springs being carried on respective inserts adjacent respective cam surfaces.

* * * * *